(12) United States Patent
Rhee

(10) Patent No.: US 8,323,390 B1
(45) Date of Patent: Dec. 4, 2012

(54) SLURRY FOR PREVENTION OF SEWER CORROSION USING MIXTURES OF MAGNESIUM HYDROXIDE AND/OR TITANIUM DIOXIDE AND SODIUM HYDROXIDE VIA THE CROWN SPRAY PROCESS

(76) Inventor: Choonghee Rhee, Rancho Palos Verdes, CA (US)

( * ) Notice: Subject to any disclaimer, the term of this patent is extended or adjusted under 35 U.S.C. 154(b) by 0 days.

(21) Appl. No.: 13/385,173

(22) Filed: Feb. 6, 2012

(51) Int. Cl.
*C09D 5/08* (2006.01)
*F16L 58/02* (2006.01)
*C23F 11/00* (2006.01)
*C09K 3/00* (2006.01)
*B32B 13/00* (2006.01)
*B32B 15/00* (2006.01)

(52) U.S. Cl. .............. 106/14.21; 106/14.05; 106/14.11; 138/145; 252/387; 428/688; 428/702

(58) Field of Classification Search .............. 106/14.05, 106/14.11, 14.21; 252/387; 138/145; 428/688, 428/702
See application file for complete search history.

(56) References Cited

U.S. PATENT DOCUMENTS

| | | | | | |
|---|---|---|---|---|---|
| 5,311,925 | A | * | 5/1994 | Waltman | 164/486 |
| 5,620,744 | A | * | 4/1997 | Huege et al. | 427/236 |
| 5,683,748 | A | * | 11/1997 | Gunderson | 427/236 |
| 5,718,944 | A | * | 2/1998 | Miller | 427/136 |
| 5,834,075 | A | * | 11/1998 | Miller | 428/34.6 |
| 6,056,997 | A | * | 5/2000 | Miller | 427/136 |

FOREIGN PATENT DOCUMENTS

JP 63-62529 A * 3/1988

* cited by examiner

*Primary Examiner* — Anthony J Green
(74) *Attorney, Agent, or Firm* — Robert R. Meads

(57) ABSTRACT

An improved sprayable aqueous slurry for inhibiting corrosion in sewer pipe lines comprising an aqueous mixture of about 100% by volume of a metal hydroxide and/or a metal dioxide selected from a class consisting of magnesium hydroxide and titanium dioxide and less than about 1% by volume of sodium hydroxide, the metal hydroxide and the metal dioxide having mixing rates of about 50 to 60% by volume with about 50 to 40% by volume of water and the sodium hydroxide having a mixing rate of about 50% by volume with about 50% of water and the slurry having a pH of 13.0 or more and a useful life of about 15 to about 24 months.

6 Claims, 6 Drawing Sheets

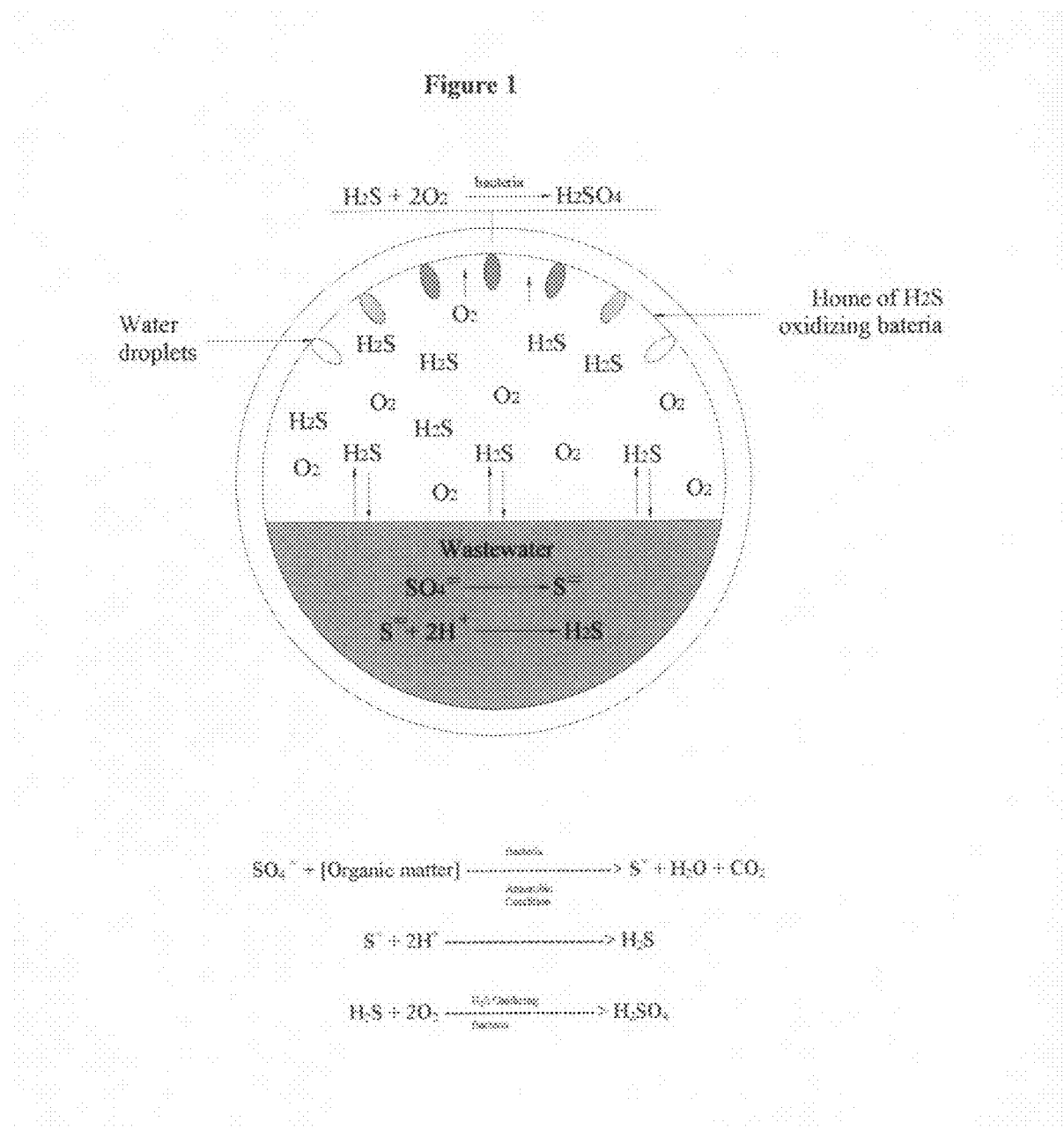

Figure 2

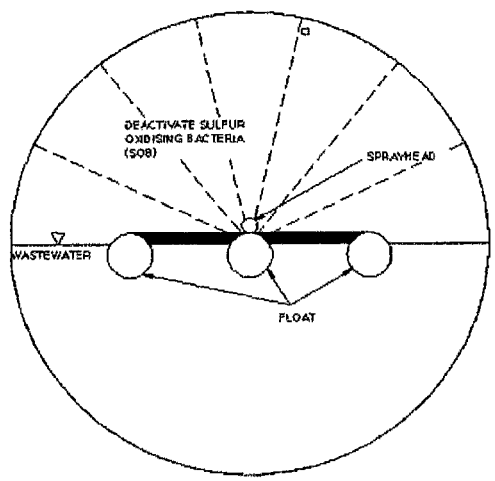

Figure 3

| | Use of Current Chemical | Use of Newly Invented Chemicals | | |
|---|---|---|---|---|
| Name of Chemicals | Magnesium Hydroxide Alone | 3 Mixture of Magnesium Hydroxide, Titanium Dioxide and Sodium Hydroxide | 2 Mixture of Magnesium Hydroxide and Sodium Hydroxide | 2 Mixture of Titanium Dioxide and Sodium Hydroxide |
| % Mixing of "A","B","C" | 100% of "A" | [90% of "A"]+ [10% ± "B"] + [Less than 1% of "C"] | [100% of "A"] + [Less than 1% of "C"] | [100% of "B"] + [Less than 1% of "C"] |
| pH | 8.5. to 9.0 | 13.0 or greater | 13.0 or greater | 13.0 or greater |
| Life Time | Approx. 6 to 8 months | Approx. 16 to 18 months | Approx. 15 to 16 months | Approx. 20 to 24 months |

| Chemical Mixing Ratio | | | pH | | | |
|---|---|---|---|---|---|---|
| "A" | "B" | "C" | 1st Experiment | 2nd Experiment | 3rd Experiment | Average |
| 90 mL | 10 mL | 0.0 mL (0.0% of "A"+"B") | 8.6 | 8.6 | 8.4 | 8.5 |
| 90 mL | 10 mL | 0.1 mL (0.1% of "A"+"B") | 11.2 | 10.7 | 11.1 | 11.0 |
| 90 mL | 10 mL | 0.2 mL (0.2% of "A"+"B") | 12.9 | 13.3 | 13.0 | 13.1 |
| 90 mL | 10 mL | 0.3 mL (0.3% of "A"+"B") | 14.0 | 13.6 | 13.5 | 13.7 |
| 90 mL | 10 mL | 0.4 mL (0.4% of "A"+"B") | 14.0 | 14.0 | 14.0 | 14.0 |
| 90 mL | 10 mL | 0.5 mL (0.5% of "A"+"B") | 14.0 | 14.0 | 14.0 | 14.0 |
| 90 mL | 10 mL | 0.6 mL (0.6% of "A"+"B") | 14.0 | 14.0 | 14.0 | 14.0 |
| 90 mL | 10 mL | 0.7 mL (0.7% of "A"+"B") | 14.0 | 14.0 | 14.0 | 14.0 |

| Chemical Mixing Ratio | | pH | | | |
|---|---|---|---|---|---|
| "A" | "C" | 1st Experiment | 2nd Experiment | 3rd Experiment | Average |
| 100 mL | 0.0 cc (0.0% of "A") | 8.8 | 8.7 | 8.8 | 8.8 |
| 100 mL | 0.1 cc (0.1% of "A") | 12.0 | 12.5 | 12.5 | 12.3 |
| 100 mL | 0.2 cc (0.2% of "A") | 13.0 | 13.0 | 13.0 | 13.0 |
| 100 mL | 0.3 cc (0.3% of "A") | 13.7 | 13.9 | 13.8 | 13.8 |
| 100 mL | 0.4 cc (0.4% of "A") | 14.0 | 14.0 | 14.0 | 14.0 |
| 100 mL | 0.5 cc (0.5% of "A") | 14.0 | 14.0 | 14.0 | 14.0 |
| 100 mL | 0.6 cc (0.6% of "A") | 14.0 | 14.0 | 14.0 | 14.0 |
| 100 mL | 0.7 cc (0.7% of "A") | 14.0 | 14.0 | 14.0 | 14.0 |

| Chemical Mixing Ratio | | pH | | | |
|---|---|---|---|---|---|
| "B" | "C" | 1st Experiment | 2nd Experiment | 3rd Experiment | Average |
| 100 mL | 0.0 cc (0.0% of "B") | 6.2 | 6.8 | 6.6 | 6.5 |
| 100 mL | 0.2 cc (0.2% of "B") | 11.1 | 11.2 | 11.3 | 11.2 |
| 100 mL | 0.3 cc (0.3% of "B") | 12.9 | 13.2 | 13.1 | 13.1 |
| 100 mL | 0.4 cc (0.4% of "B") | 14.0 | 14.0 | 14.0 | 14.0 |
| 100 mL | 0.5 cc (0.5% of "B") | 14.0 | 14.0 | 14.0 | 14.0 |
| 100 mL | 0.6 cc (0.6% of "B") | 14.0 | 14.0 | 14.0 | 14.0 |

Figure 10

| Chemicals Coated | | 5 Months Later | | 8 Months Later | | 15-16 months later | | 22-24 Months Later | |
|---|---|---|---|---|---|---|---|---|---|
| | | Without "C" | With "C" | Without "C" | With "C" | Without "C" | With "C" | Without "C" | With "C" |
| "A" + "B" + "C" | Acid Intrusion Level | Approx. 20% | Approx. 15% | Approx. 40% | Approx. 15% | Approx. 70% | Approx. 15% | | |
| | Life Expectancy | | | 8 mon. + | | 16 mon. + | | | |
| "A" + "C" | Acid Intrusion Level | Approx. 30% | Approx. 15% | Approx. 50% | Approx. 20% | Approx. 80% | Approx. 20% | | |
| | Life Expectancy | | | < 8mon. | | Approx. 16 mon | | | |
| "B" + "C" | Acid Intrusion Level | Approx. < 8% | Approx. 0% | Approx. 25% | Approx. 0% | Approx. 25% | Approx. 0% | Approx. 50% | Approx. 25% |
| | Life Expectancy | | | | | Approx. 16 mon. + | | Approx. 22-24 mon. | |

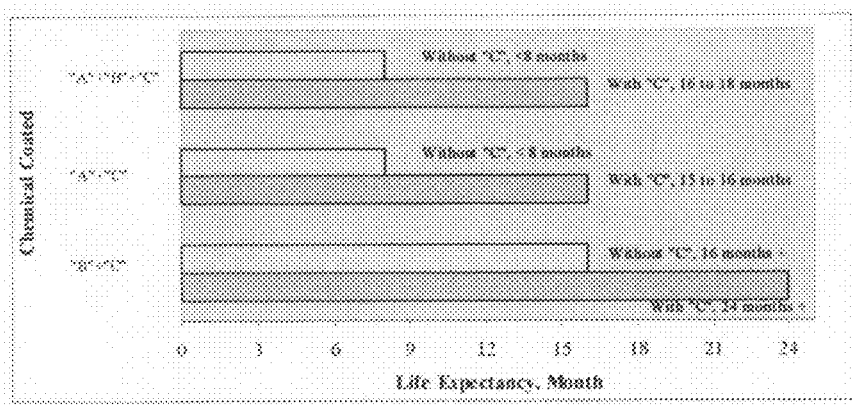

SLURRY FOR PREVENTION OF SEWER CORROSION USING MIXTURES OF MAGNESIUM HYDROXIDE AND/OR TITANIUM DIOXIDE AND SODIUM HYDROXIDE VIA THE CROWN SPRAY PROCESS

BACKGROUND OF INVENTION

U.S. Pat. Nos. 5,620,744, 5,683,748, 5,718,944, 5,834,075 and 6,056,997 outline the basic causes of corrosion in sewer pipes, such as concrete, iron or steel, as well as the prior attempts to inhibit such corrosion and to reduce the damage and ultimate failure collapse and failure of sewer pipes.

The problem has been around for decades and is not going away.

The proposed solutions have ranged from (1) crown spaying or otherwise coating of the inner surfaces of sewer pipes with lime and/or caustic soda slurries as described in the U.S. Pat. Nos. 5,620,744 and 5,683,748 were the purpose of the crown spray process is to leave residual alkalinity on the sewer crown, to (2) the currently exclusively used slurries of 50 to 60% by volume of magnesium hydroxide alone in 40 to 50% water mixture as described in the U.S. Pat. Nos. 5,718, 944, 5,834,075 and 6,056,997. Unfortunately, sewer pipes continue to corrode and fail.

The cause of the problem is well understood. As shown in the following FIG. 1, sulfate ions occur naturally in most water supplies and are present in sewage as well, sulfur being required for the synthesis of proteins and being released during their degradation. In a moist atmosphere, such as the anaerobic atmosphere found in sewer pipes, those sulfate ions are chemically reduced to hydrogen sulfide ($H_2S$) and biologically oxidized by bacteria called thiobacillus to sulfuric acid ($H_2SO_4$), which is highly corrosive to sewer pipes made of materials soluble to sulfuric acid, such as concrete, iron or steel.

Applicant's solution to the problem of sewer pipe corrosion is quite simple. When applied to the current methods of coating the interiors of sewer pipes using the well known crown spay procedure it simply involves the addition of less than 1% of sodium hydroxide by volume to the currently applied slurry of 50 to 60% by volume of magnesium hydroxide alone. The result is an immediate increase of the pH of the slurry from about 8.5 to 8.8 to a pH of 13 or above accompanied by an increased useful life of the slurry from its current 6 to 8 months to 16 to 18 months, that is an improvement of over 100%.

Similar improvements are associated with other of Applicant's proposed solutions as described in detail hereinafter, namely slurries of titanium dioxide and less than 1% by volume sodium hydroxide and slurries of magnesium hydroxide, titanium dioxide and less than 1% by volume sodium hydroxide were the useful lives of the slurries are 20 to 24 months and 16 to 18 months respectively which are improvements of over 200% and over 100% when compared to the currently used slurry of magnesium hydroxide alone.

SUMMARY OF INVENTION

An improved sprayable aqueous slurry for inhibiting corrosion in sewer pipe lines, comprising an aqueous mixture of about 100% by volume of a metal hydroxide and/or a metal dioxide selected from a class consisting of magnesium hydroxide and titanium dioxide and less than about 1% by volume of sodium hydroxide, the metal hydroxide and the metal dioxide having mixing rates of about 50 to about 60% by volume with about 50 to 40% by volume of water and the sodium hydroxide having a mixing rate of about 50% by volume with about 50% of water and the slurry having a pH of 13.0 or more and a useful life of about 15 to about 24 months.

BRIEF DESCRIPTION OF THE DRAWINGS

FIG. 1 is a drawing depicting sewer corrosion due to hydrogen sulfide ($H_2S$) oxidation.

FIG. 2 is diagram depicting the crown spry process for inhibiting sewer corrosion wherein the basic spraying system consists of a spray head mounted on a float that is pulled through the sewer at a controlled rate to spray the crown of the sewer pipe at a predetermined application rate, the spray head receiving its chemicals via a hose extending from a chemical feed tank located above ground at an upstream or insertion manhole and a chemical feed pump delivering the chemicals from the feed tank through a hose to the spray head, the hose being inserted into the sewer as the float is pulled downstream via a cable winch located at the downstream manhole.

FIG. 3 is a table comparing the characteristics of the use of the current slurry of magnesium hydroxide alone to the three new slurries of the present invention namely (1) a three component mixture of "A", magnesium hydroxide [$Mg(OH)_2$] and "B", titanium dioxide [$TiO_2$], plus "C", sodium hydroxide [$Na(OH)$], (2) a two component mixture of "A", magnesium hydroxide [$Mg(OH)_2$], plus "C", sodium hydroxide [$Na(OH)$] and (3) a two component mixture of "B", titanium dioxide [$TiO_2$], plus "C", sodium hydroxide [$Na(OH)$].

FIG. 10 is a chart of the acid intrusion level and life expectancy at coating thicknesses of 2 millimeters for each of the slurries indicated in the chart of FIG. 3.

FIG. 11 is a graphical showing of the variation in the life expectancy (i.e useful life) of each of the slurries indicated in the chart of FIG. 3.

DETAILED DESCRIPTION OF INVENTION

As previously indicated, magnesium hydroxide [$Mg(OH)_2$] alone, using the "Crown Spray Process" as illustrated in FIG. 2, is the currently applied technology for coating of magnesium hydroxide alone on the internal surface of the sewer pipe to prevent sewer pipe corrosion. Unfortunately, that process and technology results in (i) sewer pipe applied slurries comprising about 50 to 60% magnesium hydroxide in 40 to 50% water by volume and (ii) a sewer pipe coating having an initial pH of between 8.5 and 8.8 and a useful life of less than 6 to 8 months.

Figures 6, 7:
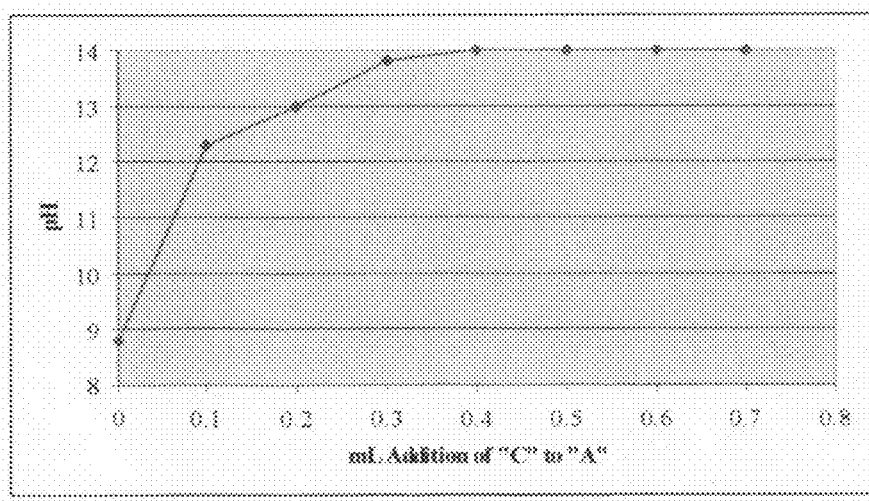
FIG. 6 is a chart indicating the variation of pH for the two component mixture of FIG. 3 comprising "A", magnesium hydroxide, plus "C", sodium hydroxide, in three different experiments.
FIG. 7 is a graph of the variation of pH due to the volume addition of "C", sodium hydroxide in the FIG. 3 mixture of "A", magnesium hydroxide plus sodium hydroxide.

According to experiments conducted during the development of the present invention, and as recorded in the first column and line in FIG. 6 in three different experiments with 100 mL of a 50 to 60% [Mg(OH)$_2$] by volume, i.e. in a 40 to 50% water mix, the pH of the 100% magnesium hydroxide mixture averaged 8.8.

Pursuant to the present invention and as recorded in lines 2 through 8 and columns 3-6 of the table of FIG. 6 and a shown in graph of FIG. 7, upon the addition of egligibly small amounts of less than 1%, by volume with water, of sodium hydroxide to 100 mL magnesium hydroxide mixtures, the pH of the resulting mixtures increased to 14 while according to FIG. 3, the useful life of the resulting mixtures increased to about 15 to 16 months which represents an increased useful life of about 100% over the useful life for the current magnesium hydroxide slurries.

Figures 8, 9:
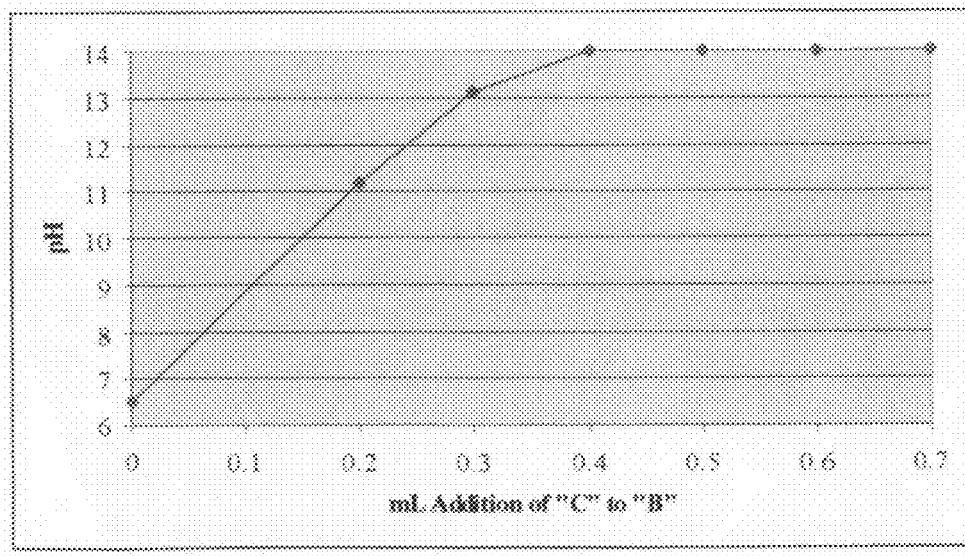
FIG. 8 is a chart indicating the variation of pH for the two component mixture of FIG. 3 comprising "B", titanium dioxide plus "C", sodium hydroxide, in three different experiments.
FIG. 9 is a graph of the variation of pH due to the volume addition of sodium hydroxide to two component mixture of "B", titanium dioxide plus "C" sodium hydroxide in the FIG. 3.

Similarly, according to experiments conducted during the development of the present invention, and as recorded in the first column and line in FIG. 8 in three different experiments with 100 mL of a 50 to 60% titanium dioxide [TiO$_2$] by volume, i.e. in a 40 to 50% water mix, the pH of the 100% titanium dioxide mixture averaged 6.5.

Pursuant to the present invention and as recorded in lines 2 through 6 and columns 3-6 of the table of FIG. 8 and a shown in graph of FIG. 9, upon the addition of negligibly small amounts of less than 1%, by volume with water, of sodium hydroxide to 100 mL titanium dioxide mixtures, the pH of the resulting mixtures increased to 14.0 while according to FIG. 3, the useful life of the resulting mixtures increased to about 20 to 24 months which represents an increased useful life of about 200% over the useful life for the current magnesium hydroxide slurries.

Figures 4, 5:
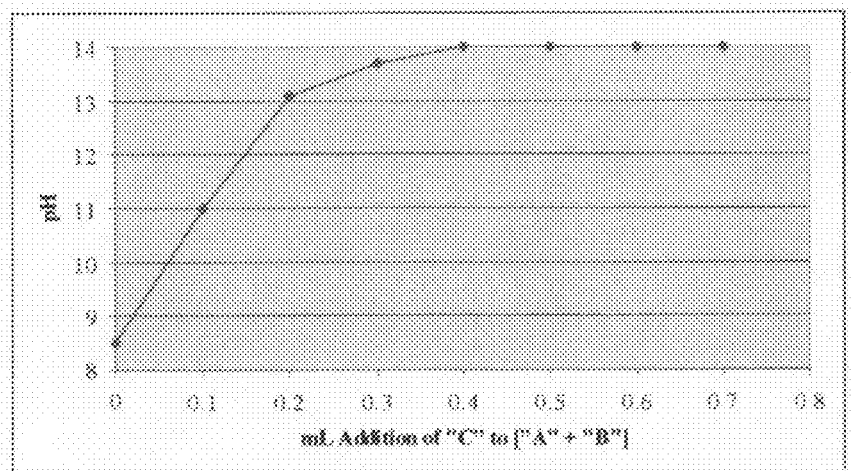
FIG. 4 is a chart indicating the variation of pH for the three component mixture of FIG. 3 comprising "A", magnesium hydroxide, "B", titanium dioxide plus "C", sodium hydroxide, in three different experiments.
FIG. 5 is a graph of the variation of pH due to the volume addition of "C", sodium hydroxide, in the FIG. 3 mixture of "A", magnesium hydroxide, and "B", titanium dioxide.

Finally, according to experiments conducted during the development of the present invention, and as recorded in the first column and line in FIG. 4 in three different experiments with 90 mL of magnesium hydroxide and 10 mL of titanium dioxide, the pH of the mixture averaged 8.5.

Pursuant to the present invention and as recorded in lines 2 through 8 and columns 3-8 of the table of FIG. 4 and a shown in graph of FIG. 5, upon the addition of negligibly small amounts of less than 1% by volume with water of sodium hydroxide to mixtures of 90 mL magnesium hydroxide and 10 mL of titanium dioxide, the pH of the resulting mixtures increased to 14 while according to FIG. 3, the useful life of the resulting mixtures increased to about 16 to 18 months which represents an increased useful life of about 100% over the useful life for the current magnesium hydroxide slurries.

Turning now to FIGS. 10 and 11. First, the chart of FIG. 10 indicates the results of a study of acid intrusion levels into and life expectancy (useful life) of slurries according to each of the three described embodiments of the present invention deposited to a thickness of about 0.08 to about 0.24 inches on the crown of sewer pipes with and without the additions of less than 1% by volume of sodium hydroxide as described previously herein over periods of time between 5 months and 24 months. Second, the chart of FIG. 11 indicates graphically the life expectancy (useful life) of each of the three described embodiments of the present invention deposited to a thickness of about 0.08 to about 0.24 inches on the crown of sewer pipes with and without the additions of less than 1% by volume of sodium hydroxide as described previously herein over periods of time between 5 months and 24 months.

From the forgoing, it should be clear that there will be a huge useful life benefit associated with the use of the present invention as a replacement for the current use of slurries of magnesium hydroxide alone. Beyond that, the financial benefits associated with such a replacement will be astronomical.

The invention claimed is:

1. An improved aqueous slurry for application to an interior of a sewer pipe to inhibit corrosion thereof, comprising:
an aqueous mixture of about 100% by volume in water of a metal hydroxide and/or a metal dioxide selected from a class consisting of magnesium hydroxide and titanium dioxide, and sodium hydroxide in an amount that is less than about 1% by volume in water, the metal hydroxide and the metal dioxide having mixing rates of about 50 to 60% by volume with about 50 to 40% by volume of water and the sodium hydroxide having a mixing rate of about 50% by volume with about 50% of water and the slurry having a pH of 13.0 or more and a useful life of about 15 to about 24 months.

2. The improved aqueous slurry of claim 1 wherein the aqueous mixture comprises the magnesium hydroxide and the sodium hydroxide and has a useful life of about 15 to 16 months.

3. The improved aqueous slurry of claim 1 wherein the aqueous mixture comprises the titanium dioxide and the sodium hydroxide and has a useful life of about 20 to 24 months.

4. The improved slurry of claim 1 wherein the aqueous mixture comprises about 90% by volume of the magnesium hydroxide, about 10% by volume of the titanium dioxide and the sodium hydroxide and the slurry having a useful life of about 16 to 18 months.

5. An aqueous slurry of applied to an interior of a sewer pipe and comprising an aqueous mixture of about 100% by volume in water of a metal hydroxide and/or a metal dioxide selected from a class consisting of magnesium hydroxide and titanium dioxide and sodium hydroxide in an amount that is less than about 1% by volume in water, the metal hydroxide and the metal dioxide having mixing rates of about 50 to 60% by volume with about 50 to 40% by volume of water and the sodium hydroxide having a mixing rate of about 50% by volume with about 50% of water and the slurry having a pH of 13.0 or more and a useful life of about 15 to about 24 months and having a thickness of about 0.08 to about 0.24 inches which is about 2 to about 6 millimeters.

6. An improvement to the current aqueous mixture used to coat the interior of sewer pipes to inhibit corrosion and which comprises about 100% by volume in water of magnesium hydroxide alone having an initial pH of about 8.5 to about 9.5 and a useful life of about 6 to 8 months, the improvement comprising an addition to the current aqueous mixture that consists of sodium hydroxide having a volume of less than about 1% by volume in water and having a mixing rate of about 50% by volume with about 50% of water and which rapidly increases the pH of the current mixture from between about 8.5 and 9.5 to greater than 13.0 and the useful life of the current mixture from about 6 to 8 months to about 15 to 16 months.

* * * * *